(12) United States Patent
Lee

(10) Patent No.: US 10,176,595 B2
(45) Date of Patent: Jan. 8, 2019

(54) IMAGE PROCESSING APPARATUS HAVING AUTOMATIC COMPENSATION FUNCTION FOR IMAGE OBTAINED FROM CAMERA, AND METHOD THEREOF

(71) Applicant: VADAS,LTD, Pohang-si, Gyeongsangbuk-do (KR)

(72) Inventor: Jun Seok Lee, Pohang-si (KR)

(73) Assignee: VADAS, LTD, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 15/561,104

(22) PCT Filed: May 6, 2015

(86) PCT No.: PCT/KR2015/004514
§ 371 (c)(1),
(2) Date: Sep. 25, 2017

(87) PCT Pub. No.: WO2016/153100
PCT Pub. Date: Sep. 29, 2016

(65) Prior Publication Data
US 2018/0122099 A1    May 3, 2018

(30) Foreign Application Priority Data

Mar. 25, 2015    (KR) .................. 10-2015-0041293

(51) Int. Cl.
*H04N 17/02*    (2006.01)
*G06T 7/80*    (2017.01)
(Continued)

(52) U.S. Cl.
CPC .............. *G06T 7/80* (2017.01); *G06T 7/33* (2017.01); *G06T 7/70* (2017.01); *H04N 5/217* (2013.01);
(Continued)

(58) Field of Classification Search
CPC . G06T 7/80; G06T 7/33; H04N 5/225; H04N 5/3572; H04N 17/002
See application file for complete search history.

(56) References Cited

U.S. PATENT DOCUMENTS

| | | | | | |
|---|---|---|---|---|---|
| 4,513,374 | A | * | 4/1985 | Hooks, Jr. ............... | H04N 9/79 365/230.04 |
| 5,764,786 | A | * | 6/1998 | Kuwashima ........... | G01B 11/00 348/E5.042 |

(Continued)

FOREIGN PATENT DOCUMENTS

| | | |
|---|---|---|
| JP | 2008-011174 A | 1/2008 |
| JP | 2009-171537 A | 7/2009 |

(Continued)

OTHER PUBLICATIONS

International Search Report & English Translation Thereof for International Application No. PCT/KR2015/004514 dated Dec. 23, 2015, 5 pages.

*Primary Examiner* — Jefferey F Harold
*Assistant Examiner* — Humam M Satti
(74) *Attorney, Agent, or Firm* — Hoffman Warnick LLC

(57) ABSTRACT

The present invention relates to an image processing apparatus having an automatic compensation function for an image obtained from a camera, and a method thereof, and provides an image processing apparatus having an automatic compensation function for an image obtained from a camera, the apparatus comprising: an automatic compensation pattern of which one or more can be provided in an arbitrary place near a camera; an input/output module which receives an image as an input from the camera and transmits the same to the image processing apparatus; and an image processing module which is a processing unit containing an algorithm for compensating for distortion of the image obtained from (Continued)

the camera, wherein the input/output module comprises an image input/output unit for transmitting/receiving data in between the camera and the image processing module, and a storage unit for storing information processed by the image processing module, and the image processing module comprises a distortion compensation unit, an image alignment estimation unit, and an image alignment generation unit, the distortion compensation unit extracting, from the received image, characteristic points of the automatic compensation pattern, estimating the absolute location and installation angle of the camera by using the information based on the extracted characteristic points, and performing lens distortion compensation by using an inner parameter stored in the storage unit, the image alignment estimation unit estimating, in the image, the camera installation location and rotational error as a change parameter by using information on the absolute location and installation angle of the camera estimated in the distortion compensation unit, and the image alignment generation unit compensating for the three-dimensional location and size of the image by using the change parameter estimated in the image alignment estimation unit.

11 Claims, 7 Drawing Sheets

(51) Int. Cl.
| | | |
|---|---|---|
| H04N 5/217 | (2011.01) | |
| H04N 5/225 | (2006.01) | |
| G06T 7/33 | (2017.01) | |
| G06T 7/70 | (2017.01) | |
| H04N 5/357 | (2011.01) | |
| H04N 17/00 | (2006.01) | |
| H04N 5/208 | (2006.01) | |

(52) U.S. Cl.
CPC .......... *H04N 5/225* (2013.01); *H04N 5/3572* (2013.01); *H04N 17/002* (2013.01); *G06T 2207/30252* (2013.01); *H04N 5/208* (2013.01)

(56) References Cited

U.S. PATENT DOCUMENTS

| | | | |
|---|---|---|---|
| 6,173,222 B1* | 1/2001 | Seo | B62D 1/28 180/421 |
| 9,225,942 B2* | 12/2015 | Zhang | B60R 1/00 |
| 9,704,287 B2* | 7/2017 | Liu | G06T 15/20 |
| 9,747,664 B2* | 8/2017 | Kakita | G06T 3/40 |
| 9,873,379 B2* | 1/2018 | Takaki | B60R 1/00 |
| 2006/0291698 A1* | 12/2006 | Oizumi | G06T 5/006 382/104 |
| 2010/0194886 A1* | 8/2010 | Asari | G06T 7/85 348/148 |
| 2012/0020518 A1* | 1/2012 | Taguchi | G06T 7/292 382/103 |
| 2012/0287232 A1* | 11/2012 | Natroshvili | G06T 7/85 348/36 |
| 2013/0188018 A1* | 7/2013 | Stevens | G06T 7/0004 348/188 |
| 2015/0146048 A1* | 5/2015 | Du | G06T 5/006 348/241 |
| 2015/0221077 A1* | 8/2015 | Kawabata | G06T 7/001 382/141 |
| 2015/0288951 A1* | 10/2015 | Mallet | H04N 17/002 348/46 |
| 2016/0275683 A1* | 9/2016 | Sakano | G06T 7/80 |

FOREIGN PATENT DOCUMENTS

| | | |
|---|---|---|
| JP | 2010-031638 A | 2/2010 |
| JP | 2010-183265 A | 8/2010 |
| KR | 10-2009-0065198 | 6/2009 |
| KR | 10-2012-0140515 | 12/2012 |
| KR | 10-13519110000 | 1/2014 |

* cited by examiner

FIG. 7

| Coordinates | n-th camera | | | | |
|---|---|---|---|---|---|
| | $X_1$ | $X_2$ | $X_3$ | ... | $X_m$ |
| $y_1$ | $T_{11}$ | $T_{21}$ | $T_{31}$ | ... | $T_{m1}$ |
| $y_2$ | $T_{12}$ | $T_{22}$ | $T_{32}$ | ... | $T_{m2}$ |
| $y_3$ | $T_{13}$ | $T_{23}$ | $T_{33}$ | ... | $T_{m3}$ |
| ... | ... | ... | ... | ... | ... |
| $y_n$ | $T_{1n}$ | $T_{2n}$ | $T_{3n}$ | ... | $T_{mn}$ |

IMAGE PROCESSING APPARATUS HAVING AUTOMATIC COMPENSATION FUNCTION FOR IMAGE OBTAINED FROM CAMERA, AND METHOD THEREOF

TECHNICAL FIELD

Example embodiments relate to an image processing apparatus and method having an automatic correction function, and more particularly, to an image processing apparatus and method having an automatic correction function that may automatically correct an installation error of a camera provided in a vehicle using an image obtained from the camera.

BACKGROUND ART

Recently, various cameras have been widely used due to the development of information and communication technology and the increase in the population of Internet users, and thus the demand for image analysis and utilization using the cameras has also been increasing. However, a distortion may occur in an image obtained from a camera due to the characteristics of lens of the camera. Such a distortion may need to be corrected to analyze and utilize the image.

In a case of a wide-angle camera having a wide viewing angle, for example, a camera provided in a vehicle, an image captured by the wide-angle camera may have a severe distortion compared to an image captured by a common type camera. Thus, when representing such an image in an image output device, a distorted image that is compressed horizontally and vertically may be displayed. In addition, it may need to correct a radial distortion that moves inwards or outwards from an original position in response to a further separation from a center of the lens.

Such an image distortion may occur in almost all cameras using lens, and thus many technologies have been developed in various technical fields to correct a distorted image. These technologies have been widely applied to a camera used for a vehicle, in particular, because such a camera is widely used in various fields due to its various functions and purposes.

A representative type of a camera used for a vehicle is a rear-view camera. The rear-view camera may need an external camera and an output device configured to simply output an image captured by the external camera. However, along with the recent development of an advanced driver assistance system (ADAS), there has emerged a need to process an image to be more suitable for the user requirements or a control system, instead of simply outputting the image. It may be needed to process an image of a camera in accordance with a requirement from a user or a system, for example, a requirement for a panoramic view or a top view.

To process an image needed for a vehicle, a distorted image may need to be corrected first. To correct a distortion, the following method may be performed. The method may include defining a camera model, estimating intrinsic and extrinsic parameters of the model from a correction pattern, and then performing restoration through an inverse transformation of the model.

In the estimating of the parameters from the correction pattern, a certain pattern tool may be used for camera calibration. Using such pattern tool, an accurate relative position of a certain marker on a pattern may be verified in advance, and thus an accurate result may be obtained. However, it may cause inconvenience because such a heavy pattern tool may need to be carried around all the time.

An example of related arts includes KR Patent Publication No. 10-2009-0065198 published on Jun. 22, 2009.

DISCLOSURE

Technical Goals

Example embodiments provide an image processing apparatus and method that has an automatic correction function for an image obtained from a camera. To correct a distortion in the image obtained from the camera, the image processing apparatus and method may use an automatic correction pattern to correct an error in a position, or location, and a posture of the camera in addition to a lens distortion of the camera.

Example embodiments also provide an image processing apparatus and method that has an automatic correction function for an image obtained from a camera. To estimate a parameter from an automatic correction pattern to correct a distortion in the image obtained from the camera, the image processing apparatus and method may use a pattern formed in various shapes, for example, a triangle, a quadrangle, a circle, and other polygons, without a need for a certain automatic correction pattern, to simply correct the image.

Technical features to be obtained by the present disclosure are not limited to the technical goals described in the foregoing.

Technical Solutions

According to an example embodiment, there is provided an image processing apparatus having an automatic correction function for an image obtained by a camera, the image processing apparatus including at least one automatic correction pattern installed at a location around the camera, an input and output module configured to receive an image from the camera and transmit the image to the image processing apparatus, and an image processing module, which is a processor including an algorithm to correct a distortion in the image obtained from the camera. The input and output module may include an image inputter and outputter being between the camera and the image processing module to receive and transmit data, and a storage in which information processed by the image processing module is stored. The image processing module may include a distortion corrector configured to extract feature points of the automatic correction pattern from the received image, estimate an absolute location and an installation angle of the camera using known information associated with the extracted feature points, and correct a lens distortion using an intrinsic parameter stored in the storage, an image alignment estimator configured to estimate, as a change parameter, an installation location and a rotation error of the camera from the image using information associated with the absolute location and the installation angle estimated by the distortion corrector, and an image alignment generator configured to correct a three-dimensional (3D) position and a size of the image using the change parameter estimated by the image alignment estimator.

In detail, a shape of the automatic correction pattern may be one of a triangle, a quadrangle, a polygon, and a circle.

In detail, figure specification information including a shape, a size, a color, and the like of the automatic correction pattern, and geometric information including a corner, a moment, and the like of the automatic correction pattern may be known information.

In detail, the intrinsic parameter may include at least one of an optical center, an aspect ratio, a projection type, or a focal length.

In detail, when the image alignment estimator estimates the installation location and the rotation error as the change parameter, the image alignment estimator may use an optimization algorithm to minimize an error of the installation location of the camera and an error of the rotation of the camera.

In detail, the optimization algorithm may be one of a Levenberg-Marquardt (LM) algorithm, a least mean squares (LMS) algorithm, an ant colony optimization (ACO) algorithm, and a particle swarm optimization (PSO) algorithm.

In detail, when the image alignment generator stores, in the storage, pieces of information estimated to correct the image, the image alignment generator may generate various forms such as a lookup table (LUT), a vertex obtained through a graphics processing unit (GPU) texture coordinate mapping method, and a user-defined metadata format, for example, an extensible markup language (XML) format, to store the pieces of the estimated information in the storage to correct the image.

According to another example embodiment, there is provided an image processing method including receiving, by an image processing module from an input and output module, an image of an automatic correction pattern captured by a camera, extracting, by a distortion corrector of the image processing module, feature points of the automatic correction pattern from the received image using known information associated with the automatic correction pattern, estimating an absolute location and an installation angle of the camera at a point in time at which the camera obtains the image using the feature points of the automatic correction pattern extracted by the distortion corrector, obtaining, by the distortion corrector, an intrinsic parameter to correct a lens distortion using the received image, correcting the lens distortion in the image through a distortion correction algorithm using the obtained intrinsic parameter, and estimating, by an image alignment estimator, a change parameter and correcting, by an image alignment generator, the image using the estimated change parameter.

In detail, the correcting of the lens distortion may include correcting the lens distortion using one of a nonlinear distortion correction method and a Gaussian sphere mapping-based distortion correction method.

In detail, the nonlinear distortion correction method may be one of a pinhole-based method and a captured ray-based method. Here, a projection equation used for the captured ray-based method may be one of an equidistant projection equation, an orthographic projection equation, an equisolid angle projection equation, and a stereographic projection equation.

In detail, the estimating of the change parameter and the correcting of the image may include matching the automatic correction pattern to an actual automatic correction pattern based on the following equation, $$XY_p = f_{pc} \cdot (S_c \cdot R(\Psi) \cdot R(\theta) \cdot R(\phi))(XY_c) \quad \text{Equation}$$

$$R(\phi) \begin{pmatrix} 1 & 0 & 0 \\ 0 & \cos\phi & \sin\phi \\ 0 & -\sin\phi & \cos\phi \end{pmatrix},$$

$$R(\theta) \begin{pmatrix} \cos\theta & 0 & -\sin\theta \\ 0 & 1 & 0 \\ \sin\theta & 0 & \cos\theta \end{pmatrix}, R(\Psi) \begin{pmatrix} \cos\phi & \sin\phi & 0 \\ -\sin\phi & \cos\phi & 0 \\ 0 & 0 & 1 \end{pmatrix}$$

-continued $$X_p = \pm S_c \sqrt{X_c^2 + Y_c^2 + Z_c^2} \cdot$$

$$\left( \frac{(X_c(\cos\theta\cos\Psi) + Y_c(\cos\theta\sin\Psi) + Z_c(-\sin\theta))}{\begin{pmatrix} X_c(\sin\phi\sin\Psi + \cos\phi\sin\theta\cos\Psi) + \\ Y_c(-\sin\phi\cos\Psi + \cos\phi\sin\theta\sin\Psi) + Z_c(\cos\phi\cos\theta) \end{pmatrix}} \right) + X_{pd}$$

$$Y_p = \pm S_c \sqrt{X_c^2 + Y_c^2 + Z_c^2} \cdot$$

$$\left( \frac{\begin{pmatrix} (X_c(-\cos\phi\sin\Psi + \sin\phi\sin\theta\cos\Psi) + \\ Y_c(\cos\phi\cos\Psi + \sin\phi\sin\theta\sin\Psi) + Z_c(\sin\phi\cos\theta) \end{pmatrix}}{\begin{pmatrix} X_c(\sin\phi\sin\Psi + \cos\phi\sin\theta\cos\Psi) + \\ Y_c(-\sin\phi\cos\Psi + \cos\phi\sin\theta\sin\Psi) + Z_c(\cos\phi\cos\theta) \end{pmatrix}} \right) + Y_{pd}$$

wherein $XY_c$ denotes an orthogonal coordinate of one point of an image in which the distortion is corrected, $XY_p$ denotes a two-dimensional (2D) coordinate of one point obtained by mapping XYc to the ground, $S_c$ denotes a scale factor, $f_{pc}$ denotes a function for mapping a 3D coordinate to one point on a plane, and $R(\varphi)$, $R(\theta)$, and $R(\psi)$ denote 3D coordinate rotation matrices as represented in Equation 3, in which $\varphi$ denotes an angle by which $XY_c$ rotates on an x axis, $\theta$ denotes an angle by which $XY_c$ rotates on a y axis, and $\psi$ denotes an angle by which $XY_c$ rotates on a z axis.

In detail, for the estimating of the change parameter and the correcting of the image, an optimization algorithm used to minimize an error between the automatic correction pattern of the image and an actual automatic correction pattern may be one of an LM algorithm, an LMS algorithm, an ACO algorithm, and a PSO algorithm.

Advantageous Effects

According to example embodiments, a lens distortion and an installation error of a camera may be simultaneously and automatically corrected using an automatic correction pattern. Thus, separate correction patterns may not need to be prepared to correct the lens distortion and the installation error of the camera. Without such separate correction patterns, an image obtained from the camera may be immediately processed and used only by correcting the image using a same correction pattern.

According to example embodiments, a simplified pattern of a shape, for example, a triangle, a quadrangle, a circle, or other polygons, in an automatic correction pattern, may be used instead of using a certain pattern tool, for example, a chessboard, that needs to be installed in a large area, and thus an image captured by a camera may be corrected simply and readily.

BRIEF DESCRIPTION OF DRAWINGS

FIG. 7 is an illustration of a lookup table (LUT).

BEST MODE FOR CARRYING OUT THE INVENTION

Figure 1:
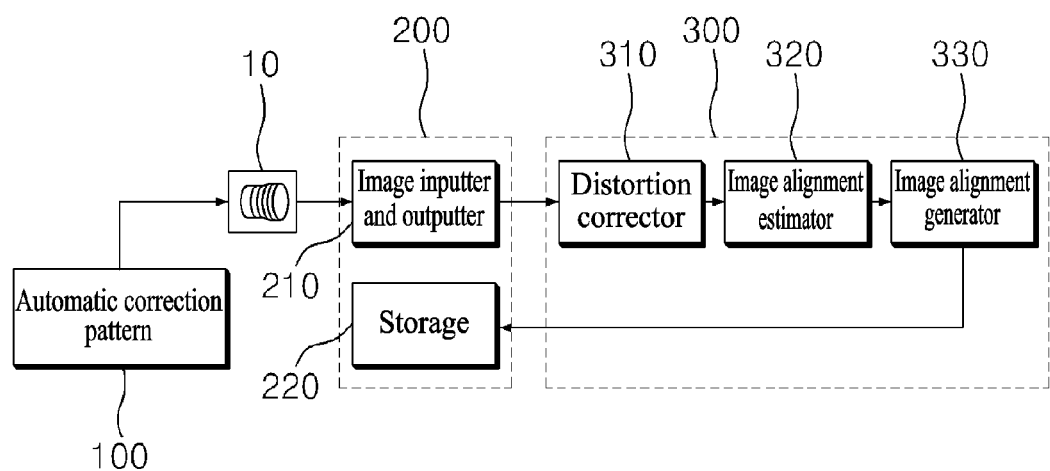
FIG. 1 is a diagram illustrating an example of an image processing apparatus having an automatic correction function for an image obtained from a camera according to an example embodiment.

Reference will now be made in detail to example embodiments of the present disclosure, examples of which are illustrated in the accompanying drawings, wherein like reference numerals refer to the like elements throughout. Also, descriptions of features that are known after an understanding of the present disclosure of this application may be omitted for increased clarity and conciseness. The example embodiments are described below in order to explain the present disclosure by referring to the figures.

FIG. 1 is a diagram illustrating an example of an image processing apparatus having an automatic correction function for an image obtained from a camera according to an example embodiment. The image processing apparatus includes a camera 10, an automatic correction pattern 100, an input and output module 200, and an image processing module 300.

Figure 2:
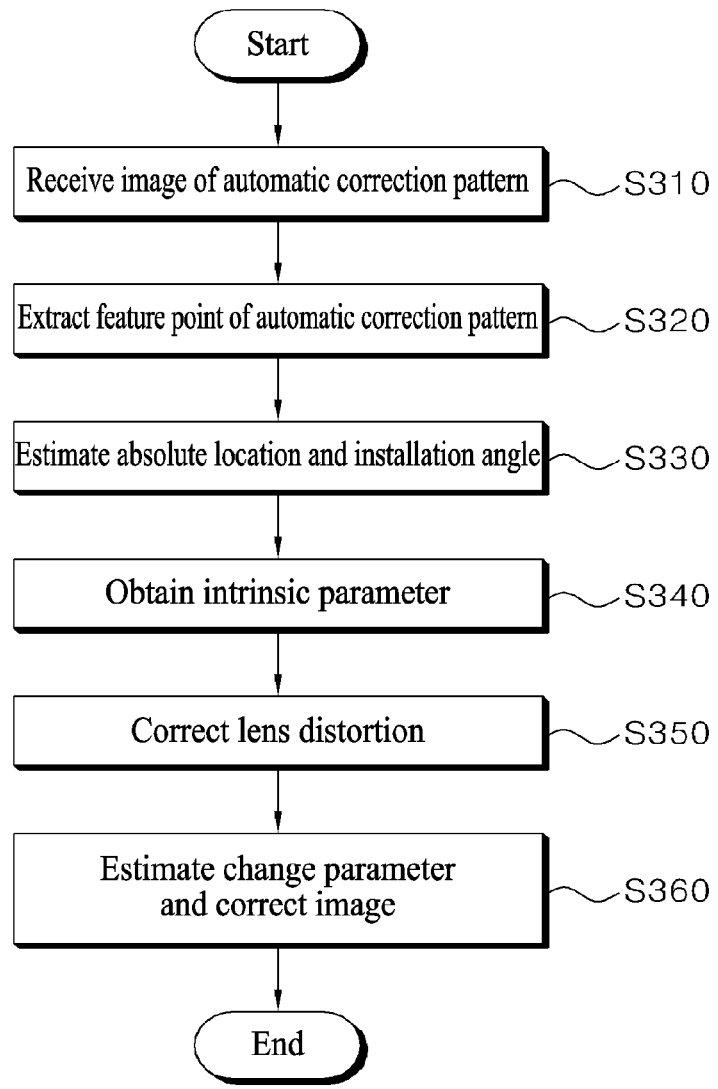
FIG. 2 is a flowchart illustrating an example of an image processing method having an automatic correction function for an image obtained from a camera according to an example embodiment.

The camera 10 may be installed at a predetermined location, and capture the automatic correction pattern 100 installed on the ground and a ground surface, convert a captured image obtained by capturing the automatic correction pattern 100 and the ground surface to an electrical signal, and transmit the electrical signal to the image processing apparatus through an image inputter and outputter 210 (refer to FIG. 2). Here, the automatic correction pattern 100 may not necessarily be formed on the ground, but be installed at any location such as a ground surface or a structure from which known information associated with the automatic correction pattern 100 may be obtained.

The camera 10 used herein refers to a concept encompassing an electrical device such as an image sensor configured to convert an optical signal to an electrical signal, in addition to a simple optical device. The camera 10 provided in a vehicle may mainly use a super-wide-angle lens to obtain a wider viewing angle. However, any type of a camera that may perform such an automatic correction function may be applicable as the camera 10, irrespective of a viewing angle.

The automatic correction pattern 100 may be a known pattern that is installed on the ground for which the camera 10 secures visibility, and provided as one or more automatic correction patterns. A shape of the automatic correction pattern 100 may be a quadrangle, and also other polygons such as a triangle and a circle may be applied.

The automatic correction pattern 100 may be a device or a medium that may enable obtainment of an absolute location and an installation angle of the camera 10 and correction of a distorted image, simultaneously, and be used therefore after being installed on the ground and captured by the camera 10.

The automatic correction pattern 100 may be installed at any location around the camera 10, and it may be desirable to select the automatic correction pattern 100 having a great brightness difference from a background of the ground to obtain visibility.

In addition, figure specification information including a shape, a size, a color, and the like of the automatic correction pattern 100, and geometric information including a corner, a moment, and the like may be known information. That is, when correcting the image using the automatic correction pattern 100, a distortion may be corrected under the assumption that physical location information of feature points of the automatic correction pattern 100 is already known.

The input and output module 200 includes the image inputter and outputter 210 configured to receive the image from the camera 10 and output the received image to the image processing module 300, and a storage 220 configured to store image information associated with a distortion-corrected image that is output from the image processing module 300.

The image inputter and outputter 210 may receive, from the camera 10 installed in the vehicle, the image that is obtained by capturing the automatic correction pattern 100 installed on the ground and the surrounding ground surface and transmit, to the image processing module 300, the received image. Here, as necessary, an image preprocessing operation may be performed in the image inputter and outputter 210 through a filter and the like.

The storage 220 may store information associated with an intrinsic parameter such as a focal length, a principal point, and a distortion coefficient that corresponds to intrinsic characteristics of a lens of the camera 10, information associated with an extrinsic parameter such as a three-dimensional (3D) location, a posture, an installation angle, and the like of the camera 10 that is estimated by the image processing module 300, and information associated with results estimated when correcting the image by the image processing module 300.

The stored information may be provided to various devices, and information associated with the distortion-corrected image may be provided to various devices such as, for example, an automobile top view system and a panoramic view system, to be processed and used therein.

The image processing module 300 refers to a module including an algorithm to correct a distortion in the image obtained by the camera 10 and includes a distortion corrector 310, an image alignment estimator 320, and an image alignment generator 330.

The distortion corrector 310 may receive the image of the automatic correction pattern 100 captured by the camera 10, extract the feature points of the automatic correction pattern 100 from the received image, estimate the absolute location and the installation angle of the camera 10 using the known physical location information of the extracted feature points, and then store such information in the storage 220. The distortion corrector 310 may estimate the absolute location at which the camera 10 is placed and a tilted angle of the camera 10 based on the automatic correction pattern 100 of the ground, and such obtained information.

In addition, the distortion corrector 310 may obtain the intrinsic parameter such as an optical center that is stored in the storage 220 to correct a lens distortion, and correct the lens distortion using the obtained intrinsic parameter.

To correct the lens distortion, the intrinsic parameter, or an optical parameter, may include at least one of an optical center, an aspect ratio, a projection type, or a focal length. The aspect ratio and the focal length may be obtained through a datasheet of a sensor, and the optical center may be determined to be a center of a lens circle or ellipse of the captured image.

The image alignment estimator 320 may estimate an installation location (X, Y, Z) and a rotation error ($\varphi$, $\theta$, $\psi$)

of the camera 10 by processing the image corrected by the distortion corrector 310 through an optimization algorithm, using the information associated with the absolute location and the installation angle of the camera 10 that is estimated by the distortion corrector 310.

Such an estimating refers to an operation of changing an angle and a distance of the automatic correction pattern 100 in the lens distortion-corrected image that is corrected by the distortion corrector 310 and transmitted to the image alignment estimator 320 such that the automatic correction pattern 100 in the lens distortion-corrected image corresponds to an actual automatic correction pattern 100 in terms of a shape and a gap, and aligning the automatic correction pattern 100 with the actual automatic correction pattern 100.

That is, using the optimization algorithm, the image alignment estimator 320 may compare the automatic correction pattern 100 in the lens distortion-corrected image to the actual automatic correction pattern 100, and estimate the installation location (X, Y, Z) and the rotation error ($\varphi, \theta, \psi$), which are a change parameter to minimize distance information, for example, an error between the two patterns.

The optimization algorithm may be one of a Levenberg-Marquardt (LM) algorithm, a least mean squares (LMS) algorithm, an ant colony optimization (ACO) algorithm, and a particle swarm optimization (PSO) algorithm.

The image alignment generator 330 may be a processor configured to correct again the lens distortion-corrected image in which the lens distortion is corrected by the distortion corrector 310, using the change parameter which is information estimated by the image alignment estimator 320.

As described above, pieces of information estimated when correcting the image by the image alignment generator 330 may be stored, in the storage 220, in various forms. The information may be stored by generating a lookup table (LUT) using a simple coordinate mapping method, generating a vertex using a graphics processing unit (GPU) texture coordinate mapping method, or generating a user-defined metadata format, for example, an extensible markup language (XML) format.

An image processing method having an automatic correction function for an image obtained by a camera will be described hereinafter in detail with reference to the accompanying drawings.

FIG. 2 is a flowchart illustrating an example of an image processing method having an automatic correction function for an image obtained from a camera according to an example embodiment. The image processing method includes operation S310 of receiving an image of an automatic correction pattern, operation S320 of extracting a feature point of the automatic correction pattern, operation S330 of estimating an absolute location and an installation angle of the camera, operation S340 of obtaining an intrinsic parameter, operation S350 of correcting a lens distortion, and operation S360 of estimating a change parameter and correcting the image.

Figure 3:
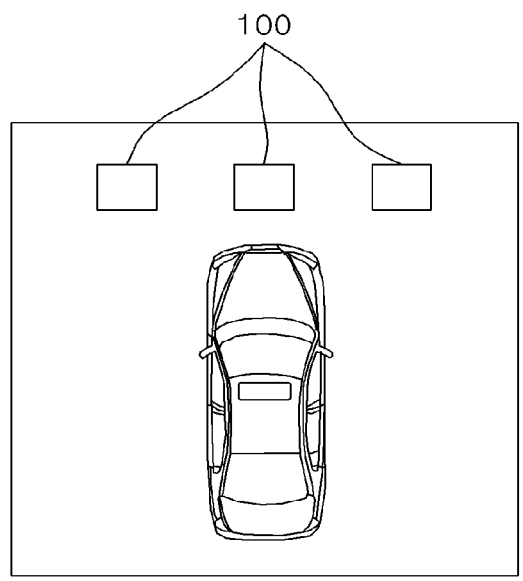
FIG. 3 is a diagram illustrating an example of the automatic correction pattern of FIG. 1 installed on the ground.
Figure 4:
FIG. 4 is a diagram illustrating an example of an image obtained by capturing the automatic correction pattern of FIG. 3.

An automatic correction pattern 100 may be installed on the ground. FIGS. 3 and 4 illustrate an example of the automatic correction pattern 100 installed on the ground and an example of an actual automatic correction pattern 100 being captured, respectively. Here, it is assumed that specification such as a size, a shape, or a color of each automatic correction pattern, and a distance between a camera 10 and each automatic correction pattern is already known by the image processing module 300. In addition, when a shape of the automatic correction pattern 100 is already known, any shapes such as a triangle, a quadrangle, a circle, or other polygons may be applicable.

Each automatic correction pattern may be installed at a location that is observed by the camera 10 installed in a vehicle. Referring to FIG. 3, a shape of the automatic correction pattern 100 is a square, a size thereof is 70 centimeters (cm), and a distance between the vehicle and a pattern located at a center is 30 cm. Here, the size and the distance are not set, and the distance may vary depending on the size of the pattern.

In operation S310 of receiving an image of an automatic correction pattern, the camera 10 may capture the automatic correction pattern 100 installed on the ground and transmit the captured image to the image inputter and outputter 210. The image processing module 300 may receive the captured image of the automatic correction pattern 100 from the image inputter and outputter 210.

In operation S320 of extracting a feature point, the distortion corrector 310 of the image processing module 300 may extract feature points of the automatic correction pattern 100 by discovering the automatic correction pattern 100 from the received image using known information associated with the automatic correction pattern 100.

In detail, a contour line may be discovered from the received image and a candidate group may be generated thereby, and then the automatic correction pattern 100 may be discovered from the received image using known information such as, for example, four vertices in a case of the automatic correction pattern 100 being a quadrangle, a convex, and the contour line within a limited aspect ratio. After the automatic correction pattern 100 is discovered, the feature points of the discovered automatic correction pattern 100 may be extracted.

In operation S330 of estimating an absolute location and an installation angle, the distortion corrector 310 may estimate an absolute location and an installation angle of the camera 10 at a point in time when the image is obtained, using the feature points of the automatic correction pattern 100 that are extracted by the distortion corrector 310 in operation S320, which is information associated with, for example, a corner and a moment.

Here, the image processing module 300 may store, in the storage 220, information associated with the estimated absolute location and the estimated installation angle of the camera 10. That is, the image processing module 300 may estimate only the absolute location at which the camera 10 is placed and the installation angle at which the camera 10 is tilted based on the automatic correction pattern 100 on the ground.

In operation S340 of obtaining an intrinsic parameter, the distortion corrector 310 may obtain an intrinsic parameter, or an optical parameter, to correct a lens distortion using the captured image. The intrinsic parameter, or the optical parameter, may include at least one of an optical center, an aspect ratio, a projection type, or a focal length.

That is, after estimating the absolute location and the installation angle of the camera 10 in operation S330, the image processing module 300 may then obtain the intrinsic parameter, or the optical parameter, including an optical center of a lens to correct the lens distortion using the captured image.

In operation S350 of correcting a lens distortion, the distortion corrector 310 may correct a lens-distorted image through a distortion correction algorithm using the intrinsic parameter obtained in operation S340. To correct the lens-distorted image through the distortion correction algorithm, various distortion correcting methods may be used.

A lens distortion may be broadly classified into a radial distortion and a tangential distortion. For example, in a case of a wide-angle lens that may capture a wide range, it may be necessary to correct a radial distortion that moves inwards or outwards beyond an original position as a distance from a center of the lens increases, compared to an image captured by a general-type lens.

In addition, correcting a lens distortion may generally indicate eliminating a lens distortion that may occur due to a difference in curvature, by performing an inverse operation on a lens curvature of a camera using a wide-angle lens, in lieu of a pinhole camera, and equalizing an incident point to an optical center based on a result of the inverse operation.

Thus, in a case in which a model equation, or a projection equation, for a lens curvature is given to correct a distortion, a degree of the distortion may be determined based on the projection equation and only a perspective distortion may remain in the image through the correcting.

A method of correcting such a lens distortion may include a nonlinear distortion correction method and a Gaussian sphere mapping-based distortion correction method. The nonlinear distortion correction method may include a pinhole-based method and a captured ray-based method.

The pinhole-based method refers to a method of correcting a distortion using a spatial coordinate and a principal axis in an image and uses a polynomial function for actual calculation.

The captured ray-based method refers to a method of correcting a distortion using a principal axis and an angle of incident light. Here, correcting a radial distortion by the captured ray-based method may indicate the same as in a pinhole projection in terms of eliminating lens refraction. As a projection equation used therefor, an equidistant projection equation, an orthographic projection equation, an equisolid angle projection equation, and a stereographic projection equation, which are represented by Equation 1 below, may be mainly used. In Equation 1, $R_f$ denotes a projected distance in an image plane, f denotes a focal length, and $\omega$ denotes an incident angle of an incident ray. In addition to Equation 1, various equations may also be used.

Equidistant projection: $R_f = f \cdot \omega$

Orthographic projection: $R_f = f \cdot \sin(\omega)$

Equisolid angle projection: $R_f = 2f \cdot \sin(\omega/2)$

Stereographic projection: $R_f = 2f \cdot \tan(\omega/2)$

The optical center may be determined to be a center of a lens circle or ellipse of the captured image. The focal length may be obtained by referring to a value given when manufacturing the lens, and to a data sheet of an image sensor. Alternatively, the focal length may be defined as a focal length value indicated when a straight line appears without a distortion when a distortion in the image is eliminated in accordance with the projection equation. Thus, by estimating such a focal length value, the focal length may be obtained.

In operation S360 of estimating a change parameter and correcting an image, the image alignment estimator 320 may calculate, relative to the automatic correction pattern 100, a location and a degree of a tilt of the image corrected by the distortion corrector 310 using the information associated with the absolute location and the installation angle of the camera 10 that are estimated by the distortion corrector 310, and then estimates a value obtained by the calculating as a change parameter. The image alignment generator 330 may then finally correct the image using the estimated value. Here, the change parameter may be represented by the installation location (X, Y, Z) and the rotation error ($\varphi$, $\theta$, $\psi$) of the camera 10.

In detail, after a pattern matching is performed on a 3D virtual sphere, and then the 3D virtual sphere is rotated such that a shape of the automatic correction pattern 100 in an image mapped to the 3D virtual sphere becomes an original shape of the automatic correction pattern 100, a difference from the actual automatic correction pattern 100 may be estimated as the change parameter and the image correction may then be performed. Here, to minimize the difference from the actual automatic correction pattern 100, an optimization algorithm may be used (refer to a middle figure of FIG. 5).

Figure 5:
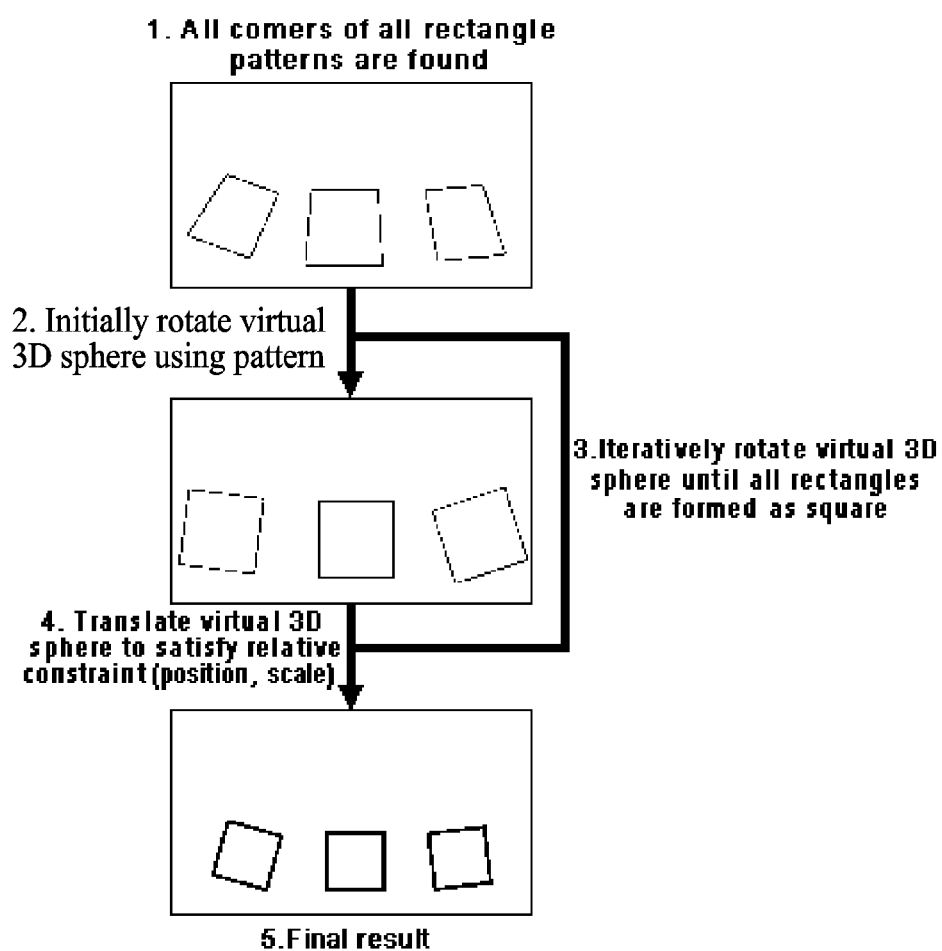
FIG. 5 is a diagram illustrating an example of an optimization algorithm according to an example embodiment.

Here, using the automatic correction pattern 100 may indicate using extracted information such as a corner and a moment of the automatic correction pattern 100 (refer to an uppermost figure of FIG. 5).

In addition, the 3D virtual sphere may be rotated repetitively until a shape of all patterns in the image becomes an original square shape using the extracted information such that the image of the automatic correction pattern 100 may finally have a corresponding position and scale (refer to the middle figure and a lowermost figure of FIG. 5).

That is, after the lens distortion-corrected image, which is obtained by correcting the lens distortion by the distortion corrector 310 of the image processing module 300, is mapped to the 3D virtual sphere, the image alignment estimator 320 may change an angle and a distance to allow the 3D virtual sphere to correspond to the automatic correction pattern 100 using the estimated absolute location and the estimated installation angle of the camera 10, and then image alignment generator 330 may finally align or arrange the image in a 3D virtual space.

Such an aligning of the image in the 3D virtual space by the image alignment generator 330 may be performed by estimating a location and a tilt of 3D virtual spheres representing the camera 10 based on the automatic correction pattern 100 on the ground, and aligning the image in the virtual space based on a value obtained by the estimating. The virtual spheres may be aligned or arranged in the 3D virtual space to represent the camera 10 actually installed in the vehicle. The estimating may be performed by changing a rotation angle and a movement (or translation) distance to increase a degree of matching the actual automatic correction pattern 100, when mapping again, to the ground, the image mapped to the virtual sphere after rotating and translating the virtual sphere. The virtual sphere may be matched to the actual automatic correction pattern 100 based on Equation 2.

$$XY_p = f_{pc} \cdot (S_c \cdot R(\psi) \cdot R(\theta) \cdot R(\varphi))(XY_c) \qquad \text{[Equation 2]}$$

In Equation 2, $XY_c$ denotes an orthogonal coordinate ($X_c$, $Y_c$, $Z_c$) of one point in the distortion-corrected image, and $XY_p$ denotes a 2D coordinate of one point obtained by mapping $XY_c$ to the ground. $S_c$ denotes a scale factor, and $f_{pc}$ denotes a function to map a 3D coordinate to one point on a plane. $R(\varphi)$, $R(\theta)$, and $R(\psi)$ denote rotation matrices of the 3D coordinate as represented by Equation 3 below. Here, when a viewing point of the camera 10 is defined as a y axis, a corresponding orthogonal direction is defined as an x axis, and a vertical direction of the vehicle is defined as a z axis, $\varphi$, $\theta$, and $\psi$ denotes an angle by which $XY_c$ rotates on the x axis, an angle by which $XY_c$ rotates on the y axis, and an angle by which $XY_c$ rotates on the z axis, respectively.

$$R(\phi)\begin{pmatrix} 1 & 0 & 0 \\ 0 & \cos\phi & \sin\phi \\ 0 & -\sin\phi & \cos\phi \end{pmatrix},$$

$$R(\theta)\begin{pmatrix} \cos\theta & 0 & -\sin\theta \\ 0 & 1 & 0 \\ \sin\theta & 0 & \cos\theta \end{pmatrix},$$

$$R(\psi)\begin{pmatrix} \cos\phi & \sin\phi & 0 \\ -\sin\phi & \cos\phi & 0 \\ 0 & 0 & 1 \end{pmatrix}$$

[Equation 3]

Here, by developing and summarizing both Equations 2 and 3 above, Equation 4 may be obtained. In Equation 4, $X_{pd}$ denotes a distance translated or moved by a virtual sphere in an x-axis direction, and $Y_{pd}$ denotes a distance translated or moved by the virtual sphere in a y-axis direction.

$$X_p = \pm S_c \sqrt{X_c^2 + Y_c^2 + Z^{2c}} \cdot \left( \frac{(X_c(\cos\theta\cos\psi) + Y_c(\cos\theta\sin\psi) + Z_c(-\sin\theta)}{X_c(\sin\phi\sin\psi + \cos\phi\sin\theta\cos\psi) + Y_c(-\sin\phi\cos\psi + \cos\phi\sin\theta\sin\psi) + Z_c(\cos\phi\cos\theta)} \right) + X_{pd}$$

$$Y_p = \pm S_c \sqrt{X_c^2 + Y_c^2 + Z^{2c}} \cdot \left( \frac{(X_c(-\cos\phi\sin\psi + \sin\phi\sin\theta\cos\psi) + Y_c(\cos\phi\cos\psi + \sin\phi\sin\theta\sin\psi) + Z_c(\sin\phi\cos\theta)}{X_c(\sin\phi\sin\psi + \cos\phi\sin\theta\cos\psi) + Y_c(-\sin\phi\cos\psi + \cos\phi\sin\theta\sin\psi) + Z_c(\cos\phi\cos\theta)} \right) + Y_{pd}$$

[Equation 4]

After the pattern matching is performed using Equations 2 through 4, by changing the change parameter, which is the rotation angle and the movement or translation distance, the optimization algorithm may be applied to minimize a difference between the automatic correction pattern 100 in the image and the actual correction pattern 100. The optimization algorithm used herein includes, for example, an LM algorithm, an LMS algorithm, a least mean squares estimation (LMSE) algorithm, an ACO algorithm, and a PSO algorithm, a gradient descent (GD) algorithm, and the like.

Through such an optimization algorithm, the installation location (X, Y, Z) and the rotation error (φ, θ, ψ) of the camera 10 may be estimated as the change parameter to minimize an error, and the image alignment generator 330 may finally correct the image using the estimated change parameter.

Figure 6:
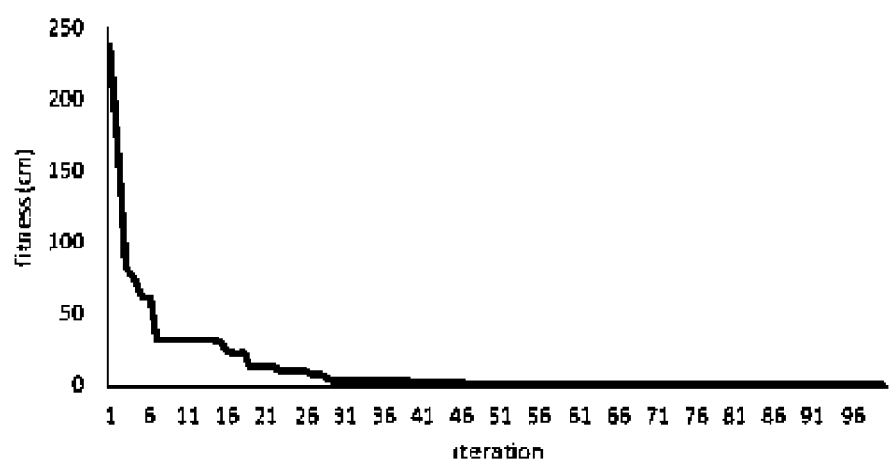
FIG. 6 is a graph illustrating an example of a result of the optimization algorithm of FIG. 5.

FIG. 6 is a graph illustrating an example of a result of a final image correction performed when a location and a size, which are relative minimum requirements for the automatic correction pattern 100, are satisfied by repetitively applying such an optimization algorithm.

As described above, after correcting a distortion in a 3D image, the image processing module 300 may track the camera 10 and original coordinates of pixels of the image to generate an LUT, a vertex using a GPU texture coordinate mapping method, or a user-defined metadata format, e.g., an XML format, and store the generated one.

FIG. 7 is a diagram illustrating an example of an LUT. The LUT refers to a means to store image mapping data associated with a relationship between each pixel included in an input image obtained by the camera 10 and each pixel included in an image to be transmitted to an image outputter such as a monitor.

Referring to FIG. 7, the LUT is a type of a mapping table that defines therein a relationship between original coordinates (x, y) of pixels included in an input image obtained by a wide-angle camera, for example, the camera 10, and final coordinates $(t_{11}, t_{12}, \ldots, t_{mn})$ of pixels included in an image to be output. Each of the final coordinates $(t_{11}, t_{12}, \ldots, t_{mn})$ of the image to be output may correspond to each of those of the input image. This is because an image to be obtained by the camera 10 using a wide-angle lens is a distorted image having a wide viewing angle. Thus, when matching such a distorted image to a plane image, pixels of the images may be matched in a relationship of N:1, rather than 1:1.

For example, a final coordinate $T_{11}$ may correspond to three input original coordinates $((x_1,y_2), (x_3,y_5), (x_4,y_6))$. In a case in which a plurality of cameras 10 is present, the number of LUTs corresponding to the number of input images to be obtained, for example, the number of the cameras 10, may be provided, and each of the LUTs may include coordinate values of a synthesized image corresponding to each of the input images.

Such an LUT may be generated by performing an inverse operation needed to obtain an output for each pixel in the same image used to generate the LUT and obtaining a coordinate of each pixel of an input image corresponding to each pixel of an image.

For example, when selecting one pixel from the pixels included in an image, the pixel may be selected based on a coordinate, and the coordinate may become a final coordinate of an image to be output.

The final coordinate of the selected pixel may be used to determine an original coordinate in the input image obtained by the camera 10. Thus, the original coordinate corresponding to the final coordinate of the pixel may be obtained and recorded.

Such a process described in the foregoing may be performed on all pixels of an image in a sequential order, and obtain an original coordinate corresponding to a final coordinate of a pixel.

By mapping the obtained original coordinate to the final coordinate of the pixel, the LUT may be generated as illustrated in FIG. 7. Here, not all the pixels of the input image may be mapped to a final coordinate of an image obtained by correcting a distortion in a 3D image. This indicates that an unnecessary pixel of the input image may be discarded, without matching a final coordinate. In general, only a pixel present in a certain area of the input image, for example, 20% to 50% of all the pixels, may be converted to an image to be finally processed by the image processing module 300, and thus the mapping may be performed only on some pixels of the input image to be converted by referring to the LUT, and therefore a load and a time used for image processing may be reduced.

After generating the LUT, the image processing module 300 may transmit the generated LUT to the input and output module 200 to be stored in the storage 220. Subsequently, by referring to the LUT stored in the storage 220, the image processing module 300 may simply and rapidly generate and display a 3D image by immediately mapping a pixel of the input image obtained by the camera 10 to the final output image, without performing synthesis.

An image processing apparatus and method having an automatic correction function for an image obtained from a camera, which is described herein, is not limited to the example embodiments described herein. Instead, an entirety or a portion of the example embodiments may be selectively combined to enable various changes, and therefore the scope of the present disclosure is defined not by the detailed description, but by the claims and their equivalents, and all variations within the scope of the claims and their equivalents are to be construed as being included in the disclosure.

DESCRIPTION OF REFERENCE NUMERALS

10: Camera
100: Automatic correction pattern
210: Image inputter and outputter
300: Image processing module
320: Image alignment estimator
200: Input and output module
220: Storage
310: Distortion corrector
330: Image alignment generator

The invention claimed is:

1. An image processing apparatus having an automatic correction function for an image obtained by a camera, the image processing apparatus comprising:
a memory in which a program for correcting a distortion in the image is recorded; and
a processor configured to execute the program,
wherein the program is executed to perform:
receiving an image of an automatic correction pattern captured by a camera
extracting feature points of the automatic correction pattern from the received image;
estimating an absolute location and an installation angle of the cameral using known information associated with the extracted feature points;
correcting correct a lends distortion using an intrinsic parameter of the camera;
estimating, as a change parameter, an installation location and a rotation error of the camera from the image using information associated with the absolute location and the installation angle; and
correcting a three-dimensional (3D) position and a size of the image using the change parameter,
wherein the estimating the change parameter comprises matching the automatic correction pattern in the image to an actual automatic correction pattern based on the following equation, in which $XY_c$ denotes an orthogonal coordinate of one point of an image in which the distortion is corrected, $XY_p$ denotes a two-dimensional (2D) coordinate of one point obtained by mapping $XY_c$ to the ground, $S_c$ denotes a scale factor, $f_{pc}$ denotes a function for mapping a three-dimensional (3D) coordinate to one point on a plane, and $R(\phi)$, $R(\theta)$, and $R(\psi)$ denote 3D coordinate rotation matrices as represented in the equation, in which $\phi$ denotes an angle by which $XY_c$ rotates on an x axis, $\theta$ denotes an angle by which $XY_c$ rotates on a y axis, and $\psi$ denotes an angle by which $XY_c$ rotates on a z axis.

2. The image processing apparatus of claim 1, wherein a shape of the automatic correction pattern is one of a triangle, a quadrangle, a polygon, and a circle.

3. The image processing apparatus of claim 1, wherein figure specification information including a shape, a size, and a color, of the automatic correction pattern, and geometric information including a corner and a moment of the automatic correction pattern are known information.

4. The image processing apparatus of claim 1, wherein the intrinsic parameter includes at least one of an optical center, an aspect ratio, a projection type, or a focal length.

5. The image processing apparatus of claim 1, wherein, for estimating the installation location and the rotation error of the camera as the change parameter, an optimization algorithm is used to minimize an error of the installation location of the camera and an error of the rotation of the camera.

6. The image processing apparatus of claim 5, wherein the optimization algorithm is one of a Levenberg-Marquardt (LM) algorithm, a least mean squares (LMS) algorithm, an ant colony optimization (ACO) algorithm, and a particle swarm optimization (PSO) algorithm.

7. The image processing apparatus of claim 1, wherein the correcting the 3D position and the size of the image using the change parameter comprises generating one or more forms selected from a group consisting of: a lookup table (LUT), a vertex obtained through a graphics processing unit (GPU) texture coordinate mapping method, and an extensible markup language (XML) format, to store pieces of estimated information in the storage to correct the image.

8. An image processing method having an automatic correction function for an image obtained by a camera, the image processing method comprising:

Equation $$XY_p = f_{pc} \cdot (S_c \cdot R(\psi) \cdot R(\theta) \cdot R(\phi))(XY_c)$$

$$R(\phi)\begin{pmatrix} 1 & 0 & 0 \\ 0 & \cos\phi & \sin\phi \\ 0 & -\sin\phi & \cos\phi \end{pmatrix},$$

$$R(\theta)\begin{pmatrix} \cos\theta & 0 & -\sin\theta \\ 0 & 1 & 0 \\ \sin\theta & 0 & \cos\theta \end{pmatrix},$$

$$R(\psi)\begin{pmatrix} \cos\phi & \sin\phi & 0 \\ -\sin\phi & \cos\phi & 0 \\ 0 & 0 & 1 \end{pmatrix}$$

$$X_p = \pm S_c \sqrt{X_c^2 + Y_c^2 + Z_c^{2c}} \cdot \left( \frac{(X_c(\cos\theta\cos\psi) + Y_c(\cos\theta\sin\psi) + Z_c(-\sin\theta))}{X_c(\sin\phi\sin\psi + \cos\phi\sin\theta\cos\psi) + Y_c(-\sin\phi\cos\psi + \cos\phi\sin\theta\sin\psi) + Z_c(\cos\phi\cos\theta)} \right) + X_{pd}$$

$$Y_p = \pm S_c \sqrt{X_c^2 + Y_c^2 + Z_c^{2c}} \cdot \left( \frac{(X_c(-\cos\phi\sin\psi + \sin\phi\sin\theta\cos\psi) + Y_c(\cos\phi\cos\psi + \sin\phi\sin\theta\sin\psi) + Z_c(\sin\phi\cos\theta)}{X_c(\sin\phi\sin\psi + \cos\phi\sin\theta\cos\psi) + Y_c(-\sin\phi\cos\psi + \cos\phi\sin\theta\sin\psi) + Z_c(\cos\phi\cos\theta)} \right) + Y_{pd}$$

receiving an image of an automatic correction pattern captured by a camera;

extracting feature points of the automatic correction pattern from the received image using known information associated with the automatic correction pattern;

estimating an absolute location and an installation angle of the camera at a point in time at which the camera obtains the image, using the feature points of the automatic correction pattern;

obtaining an intrinsic parameter of the camera to correct a lens distortion using the received image;

correcting the lens distortion in the image using the obtained intrinsic parameter; and estimating a change parameter and correcting the image using the estimated change parameter, wherein the estimating the change parameter and the correcting of the image comprises: matching the automatic correction pattern to an actual automatic correction pattern based on the following equation, $$XY_p = f_{pc} \cdot (S_c \cdot R(\psi) \cdot R(\theta) \cdot R(\phi))(XY_c)$$

$$R(\phi)\begin{pmatrix} 1 & 0 & 0 \\ 0 & \cos\phi & \sin\phi \\ 0 & -\sin\phi & \cos\phi \end{pmatrix}, R(\theta)\begin{pmatrix} \cos\theta & 0 & -\sin\theta \\ 0 & 1 & 0 \\ \sin\theta & 0 & \cos\theta \end{pmatrix}, R(\psi)\begin{pmatrix} \cos\phi & \sin\phi & 0 \\ -\sin\phi & \cos\phi & 0 \\ 0 & 0 & 1 \end{pmatrix}$$

$$X_p = \pm S_c \sqrt{X_c^2 + Y_c^2 + Z^{2c}} \cdot$$

$$\left( \frac{(X_c(\cos\theta\cos\psi) + Y_c(\cos\theta\cos\psi) + Z_c(-\sin\theta))}{X_c(\sin\phi\sin\psi) + \cos\phi\sin\phi\cos\psi) + Y_c(-\sin\phi\cos\psi + \cos\phi\sin\theta\sin\psi) + Z_c(\cos\phi\cos\theta)} \right) + X_{pd}$$

$$Y_p = \pm S_c \sqrt{X_c^2 + Y_c^2 + Z^{2c}} \cdot$$

$$\left( \frac{(X_c(-\cos\phi\sin\psi + \sin\phi\sin\theta\cos\psi) + Y_c(\cos\phi\cos\psi + \sin\phi\sin\theta\sin\psi) + Z_c(\sin\phi\cos\theta)}{X_c(\sin\phi\sin\psi + \cos\phi\sin\phi\cos\psi) + Y_c(-\sin\phi\cos\psi + \cos\phi\sin\theta\sin\psi) + Z_c(\cos\phi\cos\theta)} \right) + Y_{pd}$$

wherein $XY_c$ denotes an orthogonal coordinate of one point of an image in which the distortion is corrected, $XY_p$ denotes a two-dimensional (2D) coordinate of one point obtained by mapping $XY_c$ to the around, $S_c$ denotes a scale factor, $f_{pc}$ denotes a function for mapping a three-dimensional (3D) coordinate to one point on a plane, and $R(\phi)$, $R(\theta)$, and $R(\psi)$ denote 3D coordinate rotation matrices as represented in the equation, in which $\phi$ denotes an angle by which $XY_c$ rotates on an x axis, $\theta$ denotes an angle by which $XY_c$ rotates on a y axis, and $\psi$ denotes an angle by which $XY_c$ rotates on a z axis.

9. The image processing method of claim 8, wherein the correcting of the lens distortion comprises:

correcting the lens distortion using one of a nonlinear distortion correction method and a Gaussian sphere mapping-based distortion correction method.

10. The image processing method of claim 9, wherein the nonlinear distortion correction method is one of a pinhole-based method and a captured ray-based method, wherein a projection equation used for the captured ray-based method is one of an equidistant projection equation, an orthographic projection equation, an equi-solid angle projection equation, and a stereographic projection equation.

11. The image processing method of claim 8, wherein, for the estimating of the change parameter and the correcting of the image, an optimization algorithm used to minimize an error between the automatic correction pattern of the image and an actual automatic correction pattern is one of a Levenberg-Marquardt (LM) algorithm, a least mean squares (LMS) algorithm, an ant colony optimization (ACO) algorithm, and a particle swarm optimization (PSO) algorithm.

* * * * *